(12) United States Patent
Katoh et al.

(10) Patent No.: US 7,970,535 B2
(45) Date of Patent: Jun. 28, 2011

(54) DRIVE ASSIST SYSTEM

(75) Inventors: Seiji Katoh, Kariya (JP); Yoshinori Kawabata, Kariya (JP)

(73) Assignee: DENSO CORPORATION, Kariya (JP)

( * ) Notice: Subject to any disclaimer, the term of this patent is extended or adjusted under 35 U.S.C. 154(b) by 1032 days.

(21) Appl. No.: 11/812,392

(22) Filed: Jun. 19, 2007

(65) Prior Publication Data
US 2008/0009990 A1    Jan. 10, 2008

(30) Foreign Application Priority Data

Jul. 4, 2006  (JP) .................................. 2006-184469
Oct. 3, 2006  (JP) .................................. 2006-271822

(51) Int. Cl.
*G06F 17/00* (2006.01)
*B60Q 1/48* (2006.01)

(52) U.S. Cl. ......... 701/209; 701/301; 701/211; 348/119

(58) Field of Classification Search .................... 701/45, 701/117, 224, 300, 302, 1, 41, 36, 301, 201, 701/206, 209, 200, 211; 348/119, 113; 180/204, 180/280; 340/932.2, 436, 435
See application file for complete search history.

(56) References Cited

U.S. PATENT DOCUMENTS

| 6,014,594 | A * | 1/2000 | Heidel et al. ................... 700/231 |
| 6,411,867 | B1 * | 6/2002 | Sakiyama et al. ................ 701/1 |
| 6,564,130 | B2 * | 5/2003 | Shimazaki et al. .............. 701/41 |
| 6,654,670 | B2 * | 11/2003 | Kakinami et al. ................ 701/1 |
| 6,697,720 | B2 | 2/2004 | Ikeda |
| 6,704,653 | B2 * | 3/2004 | Kuriya et al. .................. 701/301 |
| 7,024,286 | B2 * | 4/2006 | Kimura et al. .................... 701/1 |
| 7,366,595 | B1 | 4/2008 | Shimizu et al. |
| 2002/0104700 | A1 * | 8/2002 | Shimazaki et al. ........... 180/204 |
| 2002/0183906 | A1 * | 12/2002 | Ikeda ............................... 701/36 |
| 2006/0287825 | A1 | 12/2006 | Shimizu et al. |
| 2006/0287826 | A1 | 12/2006 | Shimizu et al. |
| 2007/0057816 | A1 * | 3/2007 | Sakakibara et al. ........ 340/932.2 |
| 2008/0267748 | A1 * | 10/2008 | Stutz ............................. 414/228 |

FOREIGN PATENT DOCUMENTS

| JP | A-4-356277 | 12/1992 |
| JP | A-2000-127851 | 5/2000 |
| JP | A-2001-206147 | 7/2001 |
| JP | A-2002-127855 | 5/2002 |

(Continued)

OTHER PUBLICATIONS

Office Action dated Oct. 19, 2010 in corresponding JP patent application No. 2006-184469.

(Continued)

*Primary Examiner* — Ronnie Mancho
(74) *Attorney, Agent, or Firm* — Posz Law Group, PLC

(57) ABSTRACT

When moving a vehicle forward to park, a swept path during a period of parking operation is stored in memory. The vehicle is parked as forward parking, in which the front of the vehicle faces the dead end of a parking space of a side-by-side parking lot. In starting the vehicle from the parking space, an assist start switch is turned on to thereby cause a control unit to compute a rearward exit method to move the vehicle rearward to thereby exit from the parking space by referring to surrounding information on surroundings of the vehicle and the stored swept path. A display device is then caused to display the computed rearward exit method to notify a driver of the vehicle.

15 Claims, 12 Drawing Sheets

FOREIGN PATENT DOCUMENTS

| | | |
|---|---|---|
| JP | A-2002-127856 | 5/2002 |
| JP | A-2003-104149 | 4/2003 |
| JP | A-2003-163925 | 6/2003 |
| JP | A-2003-306105 | 10/2003 |
| JP | A-2004-203359 | 7/2004 |
| JP | A-2004-203365 | 7/2004 |
| JP | A-2004-314781 | 11/2004 |
| JP | A-2005-112267 | 4/2005 |
| JP | A-2006-088827 | 4/2006 |
| JP | A-2007-118876 | 5/2007 |

OTHER PUBLICATIONS

Office Action dated Oct. 26, 2010 in corresponding JP patent application No. 2006-271822.

* cited by examiner

FIG. 6

| NO | ITEM | INFO SOURCE | CONDITION |
|---|---|---|---|
| 1 | PARKED AREA (ROAD, PARKING LOT) | MAP DATA | |
| 2 | INDIVIDUAL PARKING SPACES | MAP DATA | IN PARKING LOT |
| 3 | FORWARD PASSABLE ROAD (YES/NO) | MAP DATA | ON ROAD |
| 4 | REARWARD PASSABLE ROAD (YES/NO) | MAP DATA | ON ROAD |
| 5 | M. DIRECTION AT PARKING (FORWARD/REARWARD) | DRIVE SENSOR | |
| 6 | SLOPE DIRECTION | SLOPE SENSOR | |
| 7 | SLOPE ANGLE | SLOPE SENSOR | |

FIG. 7

| | | | M. DIRECTION AT PARKING | | |
|---|---|---|---|---|---|
| | | | FORWARD | REARWARD | |
| PARKED AREA | ROAD | FORWARD IMPASSABLE (CONSTRUCTION, ETC.) | REARWARD START (SEE FIG. 10) | | |
| | | REARWARD IMPASSABLE (CONSTRUCTION, ETC.) | FORWARD START (SEE FIG. 11) | | |
| | | FORWARD/REARWARD PASSABLE (PARKED ON ROAD SHOULDER/ROAD SIDE) | FORWARD START (SEE FIG. 12) | | FORWARD PARKING IS TYPICAL FOR PARKING ON ROAD |
| | PARKING LOT | SPACE FOR FORWARD START | FORWARD START (SEE FIG. 13) | | CONSIDERING VEHICLE DIRECTION AND SPACE |
| | | SPACE FOR REARWARD START | REARWARD START (SEE FIG. 14) | | CONSIDERING VEHICLE DIRECTION AND SPACE |
| | | INFO. UNAVAILABLE | REARWARD START | FORWARD START | |

DRIVE ASSIST SYSTEM

CROSS REFERENCE TO RELATED APPLICATIONS

This application is based on and incorporates herein by reference Japanese Patent Applications No. 2006-184469 filed on Jul. 4, 2006 and No. 2006-271822 filed on Oct. 3, 2006.

FIELD OF THE INVENTION

The present invention relates to a drive assist system for assisting a driver in starting a vehicle from a position or area where the vehicle is parked or stopped.

BACKGROUND OF THE INVENTION

When starting a vehicle, a driver checks the safety in surroundings of the vehicle. To assist such a driver, a proximity monitor device as a drive assist system displays a video imaging an area towards which the vehicle advances.

Patent document 1 discloses a technology which assists in checking safety by displaying video of areas rearward of the vehicle when a shift position is switched to a reverse gear position.

Patent document 2 discloses a technology which assists in checking safety by displaying videos taken by in-vehicle cameras, which photograph the surroundings (front, rear, sides) of the vehicle, according to a user's switch operation. Here, the switch operation can select either "display" or "not display," and, further, one of "front," "rear," and "sides" as the displayed area.

Further, Patent document 3 discloses a parking assist system used in a rearward parking or the like. Here, a vehicle is first guided to a guide area, from which the vehicle is then moved rearward towards an individual parking space. Thereafter, subsequent necessary operations of the shift position, steering wheel, or the like for the rearward parking are announced to the driver.

However, the above drive assist systems still need to be improved to decrease a driver's load.

Patent document 1: JP-A-2000-127851
Patent document 2: JP-A-2003-163925
Patent document 3: JP-A-2003-104

SUMMARY OF THE INVENTION

It is an object of the present invention to provide a drive assist system to decrease a driver's load in starting a vehicle from a stop point such as a parking lot.

To achieve the above object, according to an aspect of the present invention, a drive assist system for a vehicle is provided as follows. A notification unit is configured to perform a notification operation for assisting a driver in moving the vehicle. A surrounding detection unit is configured to detect surrounding information on a surrounding of the vehicle. A parking information acquisition unit is configured to acquire, as parking information, information during a period of a parking operation from when the parking operation starts to when the vehicle stops in a parked area. A start method computation unit is configured to compute, when starting the vehicle from the parked area, a start method including a movement direction of the vehicle based on (i) a vehicle specification indicating a dimension of the vehicle, (ii) the acquired parking information, and (iii) the detected surrounding information. A notification control unit is configured to cause the notification unit to notify the computed start method.

According to another aspect of the present invention, a method for assisting a driver in starting a vehicle from a parked area is provided with the following: acquiring, as parking information, information during a period of a parking operation for parking the vehicle from when the parking operation starts to when the vehicle stops in the parked area; detecting surrounding information on a surrounding of the vehicle; computing, when starting the vehicle from the parked area, a start method including a movement direction of the vehicle based on the acquired parking information and the detected surrounding information; and notifying the driver of the computed start method via a display device.

According to yet another aspect of the present invention, a drive assist system for a vehicle is provided as follows. A display device is configured to display a notification operation for assisting a driver in moving the vehicle. A photographing unit is configured to photograph, as video, an area surrounding the vehicle. A parking information acquisition unit is configured to acquire parking information during a period of a parking operation for parking the vehicle from when the parking operation starts to when the vehicle stops in a parked area. A movement direction estimation unit is configured to compute, when starting the vehicle from the parked area, a movement direction at start of the vehicle based on the acquired parking information. Here, the display device displays, when the vehicle is started from the parked area, the photographed video showing an area in a movement direction of the vehicle estimated by the movement direction estimation unit.

BRIEF DESCRIPTION OF THE DRAWINGS

The above and other objects, features, and advantages of the present invention will become more apparent from the following detailed description made with reference to the accompanying drawings. In the drawings:

FIG. 6 is a diagram showing data acquired at parking according to the second embodiment;

FIG. 7 is a diagram showing an algorithm for estimating a movement direction at start according to the second embodiment;

DETAILED DESCRIPTION OF THE PREFERRED EMBODIMENTS

First Embodiment

A first embodiment of the present invention will be explained below with reference to drawings. In the embodiment, the following parking operation will be explained as an example. A subject vehicle is moved forward to enter an individual parking space of a side-by-side parking lot (shown in FIG. 4A) (referred to as "forward parking"); thereafter, when starting the vehicle, the vehicle is moved rearward to exit from the parking space (referred to as "rearward start"). However, the drive assist system need not be limited to the embodiment. For instance, a vehicle can be parked or stopped not only in a parking lot but also on a road. A layout of a parking lot can be not only a side-by-side parking (see FIG. 4A, vehicles are disposed side by side) but also a linear parking (i.e., parallel parking, vehicles are disposed longitudinally in a row see FIG. 16).

Figure 1:
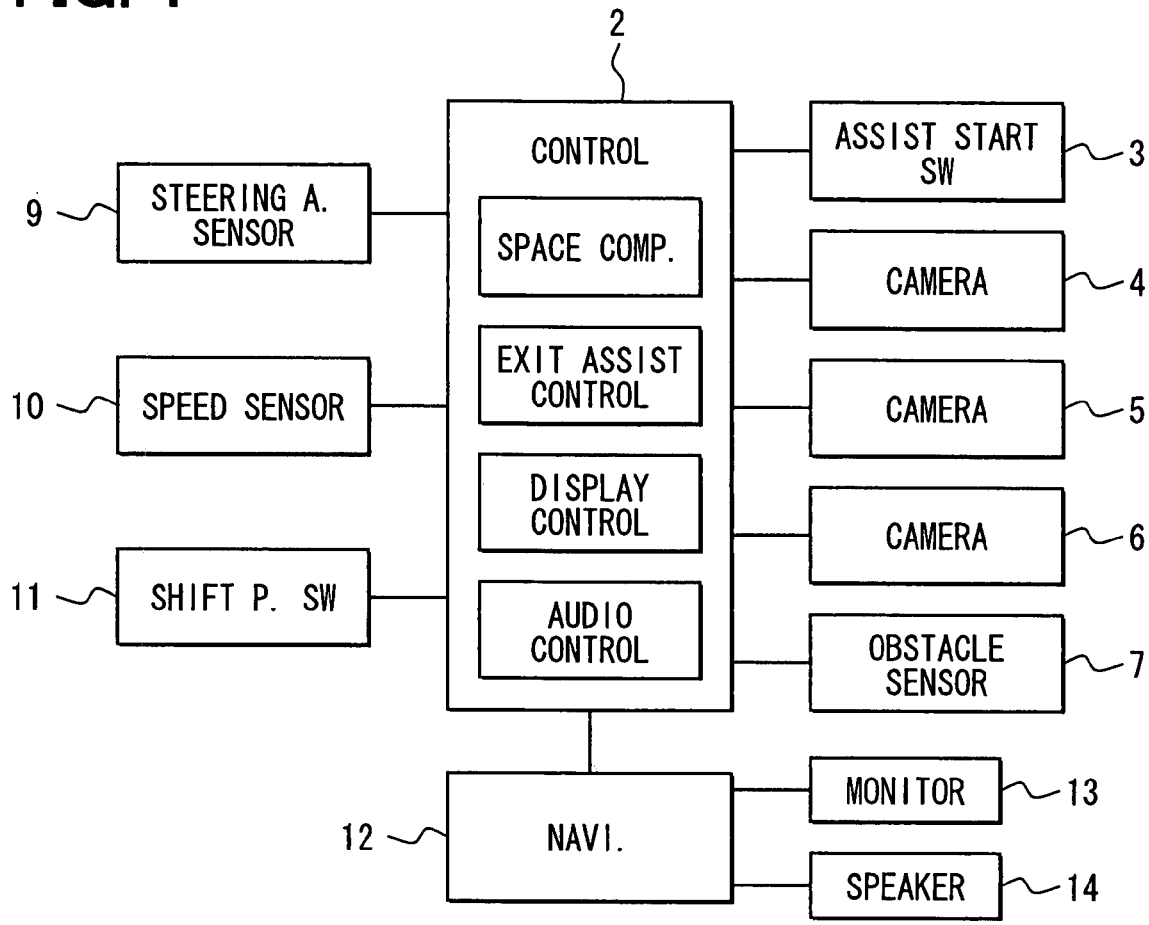
FIG. 1 is a block diagram illustrating an overall structure of a drive assist system according to a first embodiment of the present invention.

FIG. 1 shows a schematic functional block diagram of components belonging to or related to a vehicular drive assist system in a subject vehicle.

The drive assist system includes a control unit 2, which has functions of a surrounding information computation, a travel record storage, and an exit method computation. The control unit 2 is connected with an assist start switch 3, which is disposed for a driver to manipulate, in-vehicle cameras 4 to 6, and obstacle sensor group 7. The cameras 4 to 6 and/or obstacle sensor group 7 are used to detect an obstacle or the like.

Figure 2:
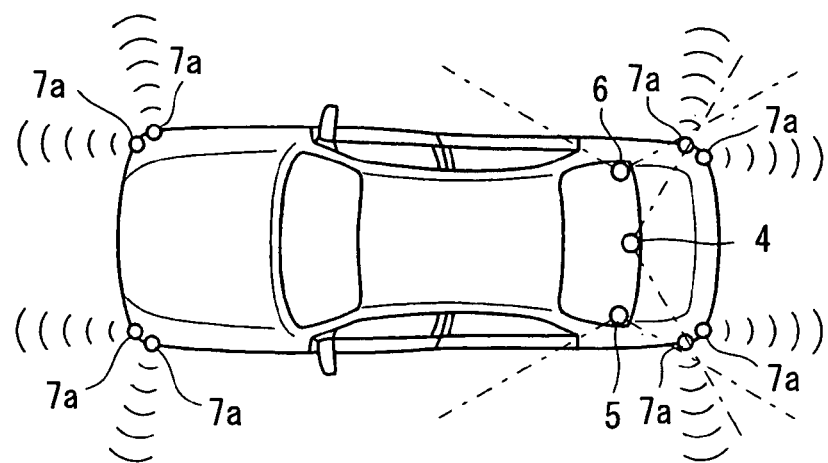
FIG. 2 is a schematic plan view of a vehicle according to the first embodiment.

The cameras 4 to 6 each are constructed of CCD camera or C-MOS camera and disposed in a rearward portion of the vehicle to photograph an area rearward, left sideward, or right sideward of the vehicle (see FIG. 2). The obstacle sensor group 7 includes eight ultrasonic sensors 7a and disposed around four (bumper) corners of the vehicle to detect obstacles existing, within about one meter, in areas forward, rearward, front left/right sideward, or rear left/right sideward of the vehicle (see FIG. 2).

Returning to FIG. 1, the control unit 2 receives a steering angle signal (indicating a rotation amount and direction of a steering wheel of the vehicle) from a steering angle sensor 9, a speed signal (indicating a vehicle speed) from a speed sensor 10, and a reverse position signal (indicating a transmission shifted in a rearward position) from a shift position switch 11. The control unit 2 communicates data with a car navigation system 12 mounted in the vehicle via an in-vehicle local areas network (LAN). The navigation system 12 has a notifying function for notifying a driver, such as a monitor (i.e., display device) 13 and a speaker 14. The navigation system 12 further includes a known position detector (not shown), and a known storage medium for storing a map database (not shown). Here, the storage medium previously stores vehicle specifications of the subject vehicle, such as dimensions (e.g., length, width) and minimum rotational radius.

The control unit 2 is an electronic control unit (ECU) having an input signal process circuit, an arithmetic circuit (i.e., CPU), a load drive circuit, a storage circuit, and a power circuit.

As shown in FIG. 1, the CPU of the control unit 2 has, as software program units, a space computation unit, an exit assist control unit, a display control unit, and an audio control unit.

The space computation unit has a function of an image process (e.g., binarization process, characteristic extraction process), which video signals from the cameras 4 to 6 are subjected to. The space computation unit computes surrounding information (i.e., space information) on surroundings of the subject vehicle based on sensor signals from the obstacle sensor group 7 and results from the image process. Thus, the surrounding information relates to areas (photograph areas) photographed by the cameras 4 to 6 and areas (detection areas) detected by the obstacle sensor group 7. Thus the space computation unit serves as a surrounding detection unit to detect surrounding information on surroundings of the vehicle.

The exit assist control unit stores in the storage circuit, as information during parking the vehicle, a vehicle swept path during parking the vehicle. The swept path is from a predetermined position (e.g., entrance/exit of a parking lot) to a position or area where the vehicle is parked (referred to as "parked area"), e.g., parking space, and acquired from the navigation system 12. The exit assist control unit then computes an exit method including a turn direction for the vehicle to rearward move when the vehicle, which was moved forward to enter a parking space, is moved rearward to exit the parking space. (In other words, the exit method including a turn direction is computed for rearward start (i.e., rearward exit) of the vehicle, which underwent forward parking (i.e., forward entrance).) This computation is made by referring to the swept path stored in the storage circuit and surrounding information computed by the space computation unit, and the vehicle specifications in the navigation system 12. Thus the exit assist control unit serves as a parking information acquisition unit to acquire, as parking information, information during a period of a parking operation. Further, the exit assist control unit serves as a start method computation unit to compute a start method, when starting the vehicle from the parked area.

The display control unit outputs or informs the exit method computed by the exit assist control unit via the monitor 13. The audio control unit outputs or informs the exit method via the speaker 14. Thus the monitor 13 and the speaker 14 serve as a notification unit; the display control unit and the audio control unit serve as a notification control unit.

Figure 3:
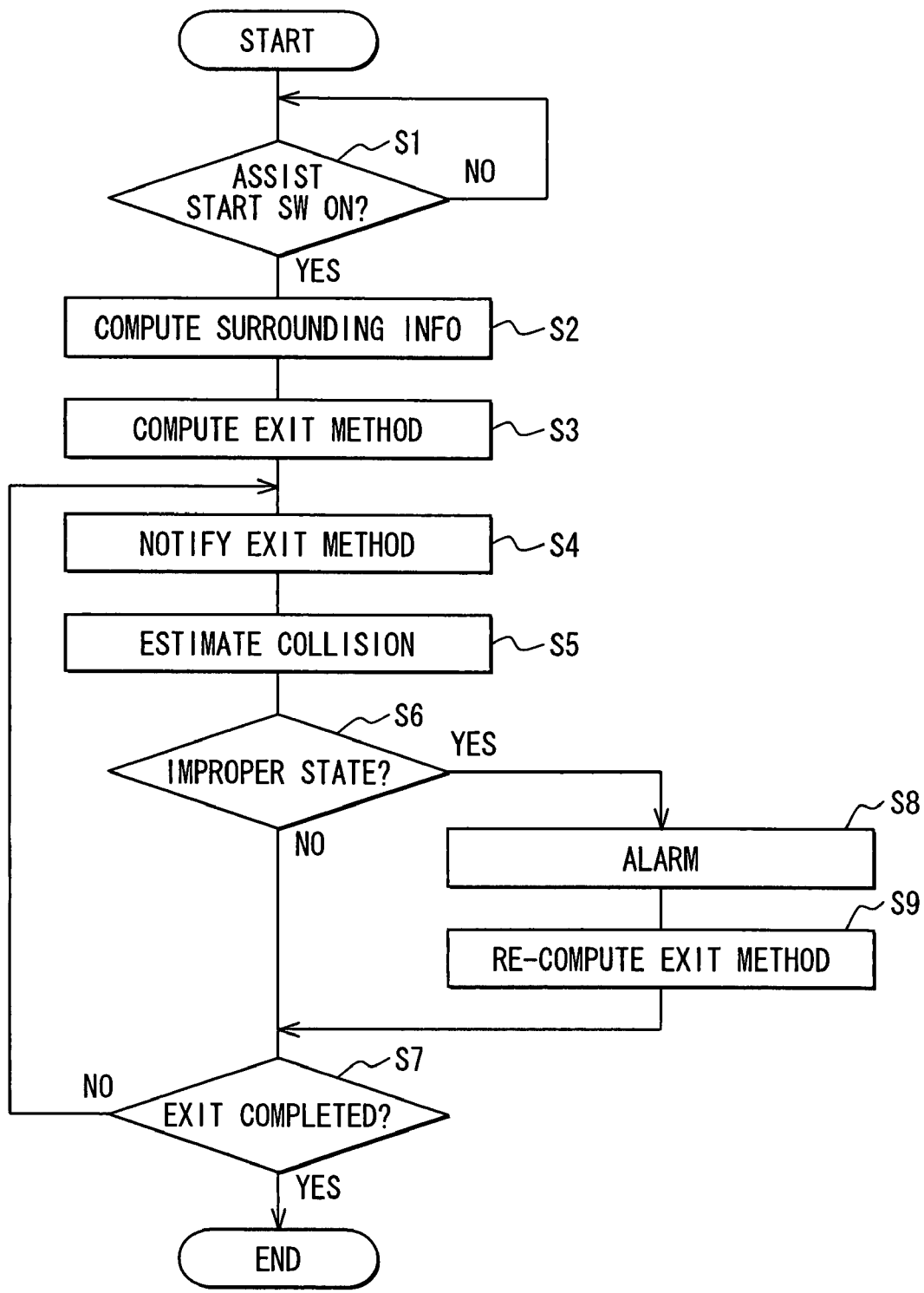
FIG. 3 is a flowchart diagram illustrating a control process according to the first embodiment.

FIG. 3 is a flowchart illustrating a drive assist routine by the control unit 2.

When a driver drives or moves the vehicle forward to park it in an individual parking space (i.e., within a parking frame), the exit assist control unit of the control unit 2 stores a swept path from when the vehicle passes through the entrance/exit of the parking lot to when the vehicle arrives at the individual parking space. Thereafter, when the driver intends to perform a rearward exit from the parking space for the vehicle having undergone forward entrance to the parking space, the driver may need an assist by the drive assist system. When needed, the driver turns on the assist start switch 3 to thereby start the drive assist routine in FIG. 3 (Step S1: YES).

When the assist start switch 3 is tuned on, the space computation unit computes the surrounding information on the surrounding of the vehicle based on the result of the image process and sensor signal of the obstacle sensor group 7 (Step S2). Next, the exit assist control unit computes the exit method including the turn direction during moving the vehicle rearward by referring to the stored swept path, the computed surrounding information, and the vehicle specifications in the navigation system 12 (Step S3).

Then a notification operation takes place, i.e., the display control unit and audio control unit inform or notify the computed exit method via the monitor 13 and speaker 14, respectively (Step S4). The exit method can be notified in the following manner.

Figure 4A:
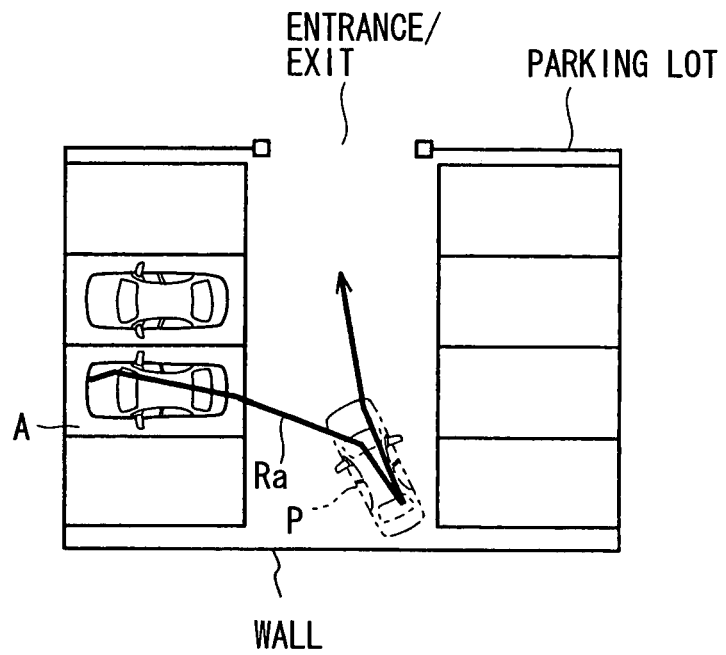
FIG. 4A is a view illustrating a layout example of a parking lot according to the first embodiment.
Figure 4B:
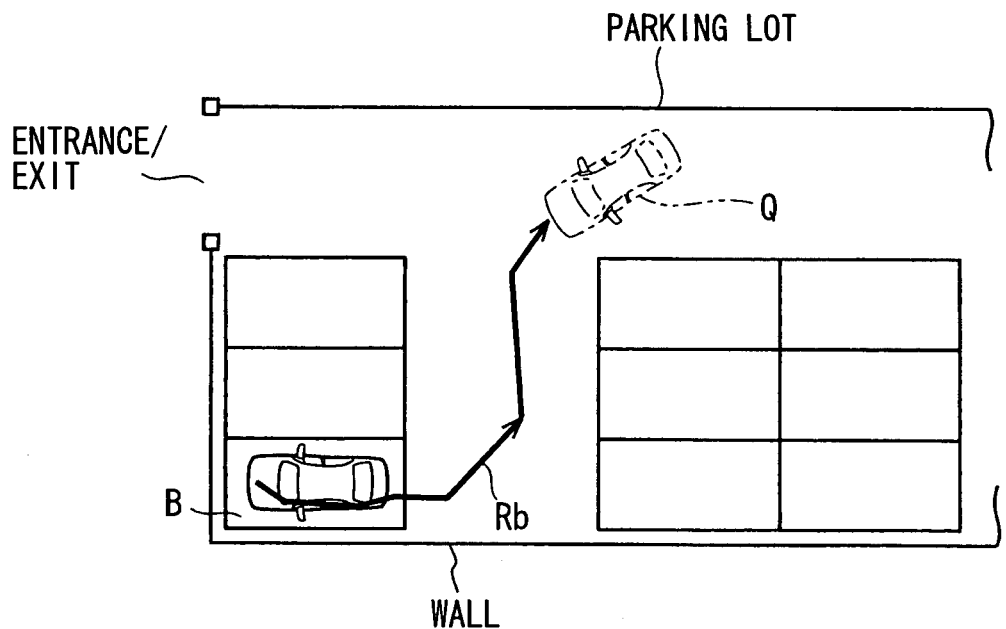
FIG. 4B is a view illustrating another layout example of a parking lot according to the first embodiment.

FIGS. 4A, 4B show a state that the back of the vehicle faces the entrance/exit of the individual parking space A, B; in other words, the head of the vehicle faces the dead end of the parking space A, B. This is because that the vehicle was moved forward to enter the individual parking space A, B. For instance, the shape of the vehicle and the movement direction Ra (In FIG. 4A), Rb (in FIG. 4B) are displayed on the monitor 13. Further, the speaker 14 announces an audio guidance, e.g., "Move the vehicle rearward while turning the steering wheel left." Thus, after the assist start switch 3 is tuned on, the drive assist during moving the vehicle rearward takes place using the information displayed by the monitor 13 and the audio guidance announced by the speaker 14.

After Step S4 is completed, movement states (e.g., a distance from an obstacle detected by the obstacle sensor group 7, a vehicle speed, and an angle or rotational direction of the steering wheel) of the vehicle are supervised and it is estimated or determined whether the vehicle collides with an obstacle based on the result from the supervision (Step S5). Next, based on the results of the supervision and estimation, it is determined whether an improper state occurs (Step S6). The improper state signifies that the vehicle, which is being moved rearward, may collide with an obstacle, or that a rearward movement direction of the vehicle is not based on the instructed exit method.

For instance, in FIG. 4A, when the vehicle is moved rearward while turning the steering wheel left, the right front portion of the vehicle may collide with a vehicle as an obstacle adjacent rightward. In FIG. 4B, when the vehicle is moved rearward while turning the steering wheel right, the left front portion of the vehicle may collide with a wall as an obstacle adjacent leftward. Otherwise, in FIG. 4B, if the vehicle is moved straight rearward, the vehicle may be impossible to exit from the parking lot because of insufficient space rearward of the vehicle.

When an improper state does not occur (Step S6: NO), it is determined whether the vehicle completely exits from the individual parking space (Step S7). When the exit is completed, the drive assist routine ends. In FIG. 4A, when the vehicle is moved rearward up to Position P, the exit is determined to be completed. In FIG. 4B, when the vehicle is moved rearward up to Position Q, the exit is determined to be completed.

In contrast, when an improper state occurs (Step S6: YES), the driver is notified of the improper state using audio alarm via the speaker 14 (Step S8). Further, at this moment, the driver may be further notified using a display window on the monitor 13.

Thereafter, an exit method is re-computed from the current position (Step S9). The re-computed exit method may be that the vehicle is once moved forward and the drive operation for exit is then attempted again.

If the estimation result indicates that the vehicle may collide with an obstacle, the notification operation at Step S4 takes place to instruct the driver to properly move the vehicle and turn the steering wheel until the determination at Step S7 is affirmed (i.e., until the vehicle completely exits from the individual parking space).

Thus, until the vehicle completely exits from the parking space, the drive assist is continuously performed to display information on the monitor 13 and to announce the audio guidance via the speaker 14 during moving the vehicle rearward.

In the above embodiment, a proper assist is performed to a driver in the case that a vehicle, which was parked with the front of the vehicle adjoins the dead end of an individual parking space, is moved rearward to leave the parking space, and, further, a driver feels difficulty due to an insufficient rearward space and a sideward obstacle (adjacent vehicle or wall). This can relieve the driver from the load to move the vehicle rearward from the position, where the vehicle has been parked with the front facing the dead end of the parking space.

Further, if the vehicle may collide with an obstacle while rearward movement, an audio alarm is outputted via the speaker 14 to indicate the possibility of the collision. This can help remove driver's concern (about collision with an obstacle) during moving the vehicle rearward and enhance the reliability of the assist for the driver.

Further, if there is possibility that the vehicle may collide with an obstacle, a proper audio instruction is made to the driver so as to control moving the vehicle and turning of the steering wheel via the speaker 14. This can increase an accuracy in assisting the driver.

Recently, a parking lot requires a driver to park a vehicle while the front of the vehicle faces a dead end of an individual parking space (so called forward parking or forward entrance).

The forward parking is useful in preventing an exhaust from making walls dirty or adversely affecting on plants or the like; further, it is expected to shorten a time for entering and existing from the lot. Thus, the forward parking is expected to further increase.

Here, in the forward parking, entering an individual parking space is easy, whereas exiting from the space is not so easy. This is because a rearward space or sideward obstacle increases a difficulty in moving the vehicle rearward depending on relation therebetween. Thus, the forward parking involves a problem.

To solve such a problem, the vehicular drive assist system according to the first embodiment assists in rearward exit for the vehicle, which was parked forward, to leave the parking space and relieves the load or concern of the driver.

Further, the car navigation system 12 may be provided as needed in the first embodiment. If no navigation system is provided, another means for detecting a swept path of the vehicle is required. The obstacle sensor group 7 may be alternatively constructed of a sensor using a laser sensor or microwave sensor, instead of an ultrasonic sensor 7*a*.

Second Embodiment

The first embodiment exemplifies a case that a vehicle is moved forward to be parked in a parking space of a side-by-side parking lot and thereafter moved rearward to exit from the parking space (referred to as "forward entrance and rearward exit" or "forward parking and rearward start" in a side-by-side parking lot). In contrast, a second embodiment is not limited to the forward parking and rearward start in a side-by-side parking and exemplifies another case that a vehicle is stopped and thereafter started. Further, surrounding information (i.e., space information) on surroundings of a subject vehicle further includes a slope of a road relative to a horizontal plane. Furthermore, there are provided a variety of notification examples in the second embodiment.

Figure 5:
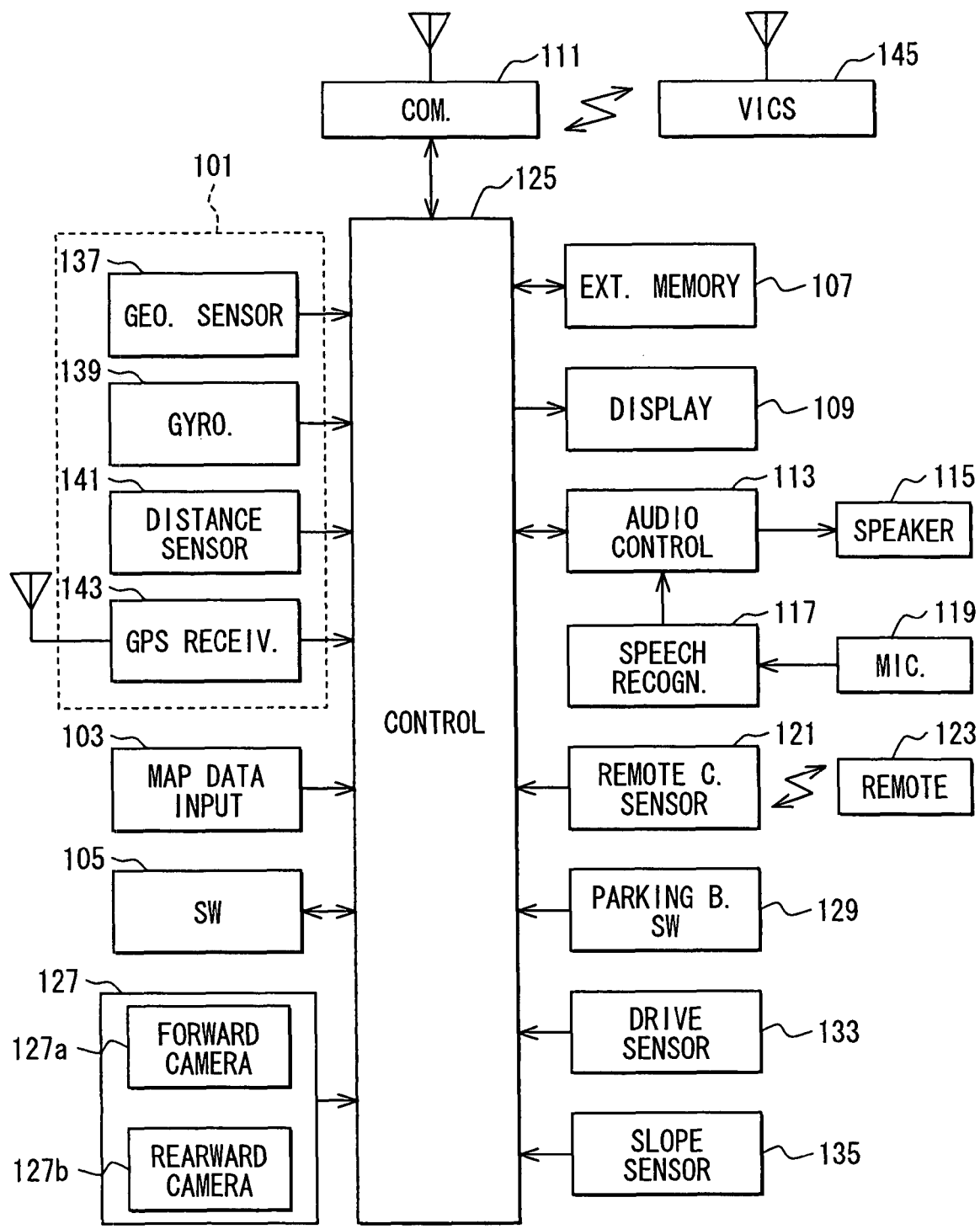
FIG. 5 is a block diagram illustrating an overall structure of a drive assist system according to a second embodiment of the present invention.

In the second embodiment, the drive assist system estimates a start direction or a movement direction at start (i.e., re-start after parking) based on information acquired at parking or stopping and displays an image or video of the estimated movement direction on a monitor.

a) Configuration of drive assist system (see FIG. 5)

The drive assist system of the second embodiment uses a car navigation system. The navigation system includes a position detector 101, a map data input unit 103, an operation switch group 105, an external memory device 107, a display device (monitor) 109, a communicator (transmitter/receiver) 101, an audio controller 113, a speaker 115, a speech recognition device 117, a microphone 119, a remote control sensor 121, a remote 123, and a control device 125 connected with the foregoing components.

Further, in addition to the navigation system, the drive assist system further uses a photographing device 127, a parking brake switch 129, a vehicle drive sensor (e.g., gear sensor, speed sensor) 133, and a slope sensor 135, all of which are connected with the control device 125.

The position detector 101 includes a geomagnetic sensor 137, a gyroscope 139, a distance sensor 141, and a GPS receiver 143. These sensors or the like 137, 139, 141, 143 have individual types of detection errors; therefore, they are used to complement each other.

The map data input unit 103 receives a storage medium (not shown) and is used to input various data stored in the storage medium such as map matching data, map data, and landmark data for increasing an accuracy for position detection. Here, the storage medium may be generally a CD-ROM or DVD-ROM due to a large data volume; however, it can be a memory card, an HDD (hard disk drive), or the like.

The operation switch group 105 uses a touch-sensitive switch integrated in the display device 109 or a mechanical switch, etc., to perform an input operation to the control device 125 for various functions (e.g., map scale change, menu display selection, destination designation, route retrieval, route guide start, current position amendment, display window change, or audio volume control).

The remote 123 has multiple operation switches (not shown) to input various instruction signals to the control device 125; thereby, the control device 125 performs the various functions.

The external memory device 107 is a rewritable storage device with a large data volume such as HDD. The external memory device 107 is suitable used for storing (i) data having a large data volume, (ii) data which needs to be stored even with power off, and/or (iii) data copied via the map data input unit 103 and frequently used. Here, the external memory device 107 may be a removable memory device having a relatively small data volume.

The display device 109 is constructed of a liquid crystal display or an organic EL (Electro-Luminescence) with a capability of a full color display, and is used to display a map or a window for designating a destination. The display device 109 further displays, when not used for the navigation, videos or images of states or areas forward or rearward of the vehicle scanned or photographed by the photographing device 127.

The communicator 111 receives road traffic information, weather information, facilities information, advertisement information, or the like provided from an outside infrastructure (e.g., VICS (Vehicle Information and Communication System) center 145), and transmits vehicle information, driver information, or the like to an outside. The externally received information is processed by the control device 125. When needed, the information processed by the control device 125 can be outputted via the communicator 111.

The speaker 115 informs an outside of a predetermined audio or speech (for route guide, display window operation, speech recognition result) based on audio output signals inputted from the audio controller 113.

The microphone 119 inputs audio or speech uttered by an operator to the speech recognition device 117 as electrical signals.

The speech recognition device 117 collates the operator's input speech with word data in a recognition dictionary internally stored therein and inputs the most matched word data to the audio controller 113 as a recognition result.

The audio controller 113 controls the speech recognition device 117 and, at the same time, performs a talk back output control (speech output) to the operator, who inputted speech, via the speaker 115. Further, the audio controller 113 inputs a recognition result from the speech recognition device 117 to the control device 125.

The photographing device 127 acquires, as videos, states of areas forward and rearward of the vehicle, as surrounding information (i.e., space information) and uses a camera, an infrared monitor device, or the like. Here, the photographing device 127 uses a forward camera 127a for photographing an area or state forward of the vehicle and a rearward camera 127b for photographing an area or state rearward of the vehicle. The photographing device 127 can be optionally connected or disconnected with the control device 125. Further, the photographing device 127 can be assembled into the control device 125 to prevent easy removal.

The vehicle drive sensor 133 functions as a gear sensor to detect a vehicle's gear (P, R, D) and as a speed sensor to detect a vehicle speed.

The slope sensor 135 measures slope information relating to a slope direction and a slope angle of the vehicle relative to a horizontal plane of a parked area (i.e., a road or a parking lot) and communicates the measured slope information to the control device 125. The slope sensor 135 can be assembled to the gyroscope 139.

The control device 125 is constructed of a known computer to include a CPU, ROM, RAM, Input/Output (I/O), and a bus line connecting the foregoing (non shown).

The control device 125 performs, as the navigation function, predetermined processes (e.g., map scale change, menu display selection, destination designation, route retrieval, route guide start, current position amendment, display window change, audio volume control) based on various information from the position detector 101, the map data input unit 103, the operation switch group 105, the external memory device 107, the communicator 111, the audio controller 113, the speech recognition device 117, or the remote 123. The control device 125 outputs results from the performed processes to the display device 109 and the speaker 115.

For instance, when a destination is designated via the remote 123 or operation switch group 105, the control device 125 retrieves an optimum route from the current position detected by the position detector 101 to the designated destination to designate a guide route and displays the designated guide route.

The designated guide route is superimposed on a display map shown in the display device 109 based on the map data input unit 103 along with a mark of the current position detected by the position detector 101. Further, a current clock time, traffic congestion information, or the like is also superimposed on the display map.

In particular, in the second embodiment, the control device 125 causes the display device 109 to display a video or image (taken by the photographing device 127) of an estimated movement direction of the vehicle at start. Namely, the movement direction of the vehicle at start is estimated based on a vehicle's position and map information from the navigation system and information from the vehicle drive sensor 133 and slope sensor 135 in a case that the vehicle is parked. Thus, the control device 125 serves as a movement direction estimation unit.

b) Estimation procedure of a movement direction at start

Next, a main process by the control device 125, i.e., an estimation procedure of a movement direction at start will be explained below. To estimate a movement direction, information on a position or area (i.e., parked area) where a vehicle is parked and information on a movement direction at parking are used.

(1) Acquiring States During a Parking Operation

Information acquired during the parking operation is shown in FIG. 6.

Here, information during the parking operation includes (i) information acquired up to a time when the control device 125 stops after the vehicle is completely parked, and, further, (ii) information acquired up to a time when the parked or stopped vehicle is re-started; then, acquired information may be stored in a memory device as needed. Thus, the above information can be used when the vehicle is re-started. Further, in addition to the information in FIG. 6, the information acquired during the parking operation can include a vehicle's swept path from when the parking operation is started to when the parking is completed and the vehicle stops.

(2) Estimation of Movement Direction

The movement direction at start (i.e., start direction) is estimated based on algorithm in FIG. 7 using the information acquired during the parking operation.

(3) Storing Information.

The estimated movement direction and a slope direction and slope angle of the parked area are stored in a storage device such as the external memory device 107.

(4) Data Extraction at Start

Thereafter, when an accessory switch (ACC) (not shown) is turned on for starting the vehicle, the information stored at above preceding (3) in the external memory device 107 are extracted.

(5) Video Display

When the parked area has a large slope, the vehicle may be moved to a direction (i.e., lower leveled direction) approaching a lower leveled area due to the gravity. When the estimated movement direction is reverse to the lower leveled direction, it is uncertain that the vehicle is moved to either direction, i.e., the estimated movement direction or lower leveled direction. Therefore, the display device 109 displays videos showing areas forward and rearward of the vehicle.

c) A Process performed by the control device 125 will be explained with reference to FIGS. 8 to 15.

(1) Process During Parking Operation

The process starts when the ACC is turned on.

Figure 8:
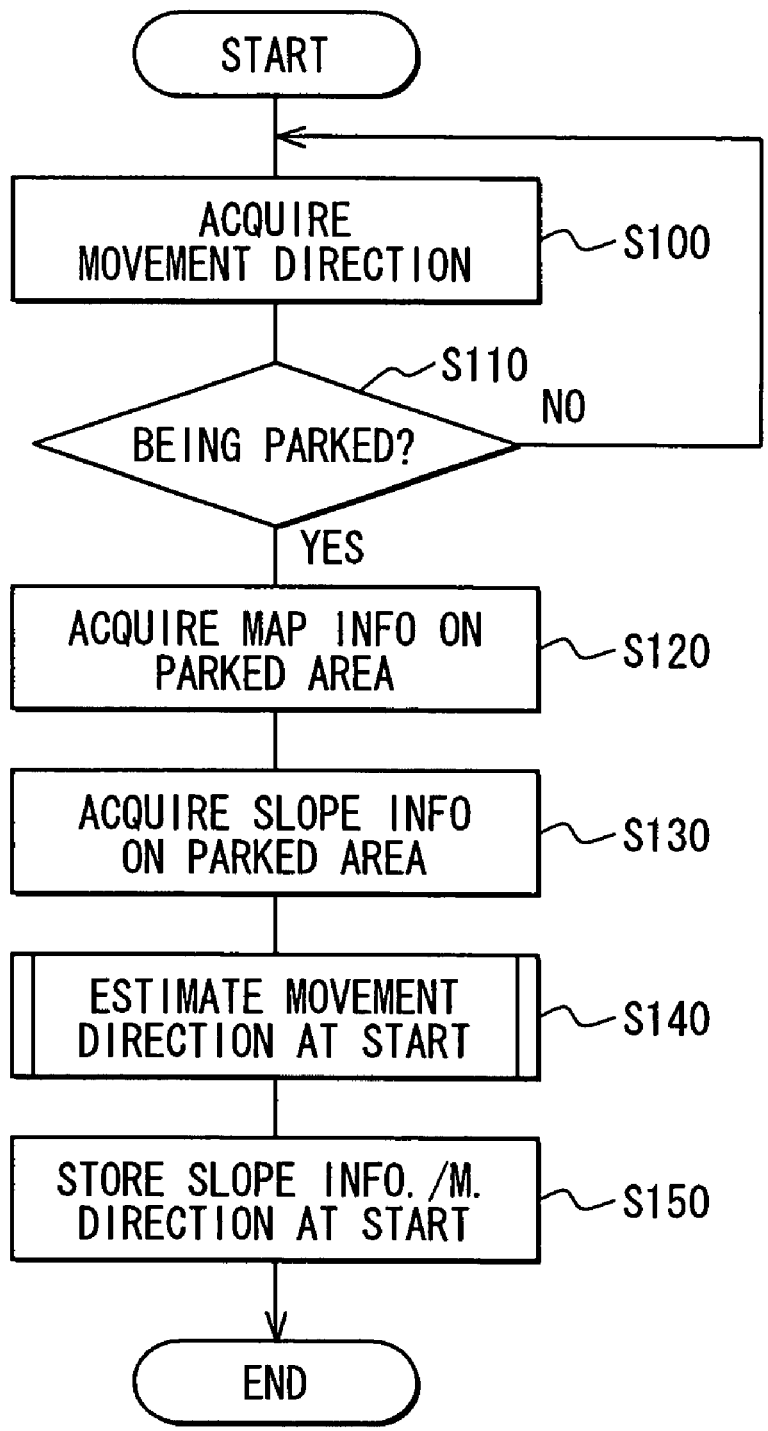
FIG. 8 is a flowchart diagram illustrating an overall process at parking according to the second embodiment.

As shown in FIG. 8, at Step S100, information on whether the vehicle is moved forward or rearward is acquired based on a signal indicting a gear position from the vehicle drive sensor 133.

Next, at Step S110, it is determined whether the vehicle is parked or not. For instance, it is determined whether the engine is stopped, a gear position is shifted to P (Parking), and a parking brake is pulled. When all are determined affirmatively, it is determined that the vehicle is parked. Whether the parking brake is pulled is determined by ON/OFF of a parking brake switch 129.

At Step S120, position information of the parked area is acquired from the navigation system and stored in a proper memory area as the information acquired during the parking operation. For instance, a current position of the vehicle parked (i.e., a position of a parked area) is acquired and whether the parked area is on a road or not is acquired. When the parked area corresponds to a parking lot, information on individual parking spaces of the parking lot is acquired. In contrast, when the parked area is on a road, information is acquired to determine whether an area forward of the vehicle is a passable road or not, or whether there is a passable road rearward of the vehicle (i.e., the vehicle is allowed to move rearward thereof). Further, at Step S120, the control device 125 may start to record a swept path and thereafter the recorded swept path up to a time when the vehicle is completely stopped may be stored in a proper memory area.

At Step S130, a slope angle and a slope direction are acquired based on signals from the slope sensor 135.

At Step S140, a movement direction (i.e., forward movement or rearward movement) at start (i.e., next start from the parked area) is estimated using the above information acquired during the parking operation (including the swept path when available) based on the algorithm in FIG. 7.

At Step S150, the slope information acquired at Step S130 and the movement direction at start acquired at Step S140 are stored in the external memory device 107; then, the process once ends.

Here, estimating the movement direction at start at Step S140 will be explained further in detail.

Figure 9:
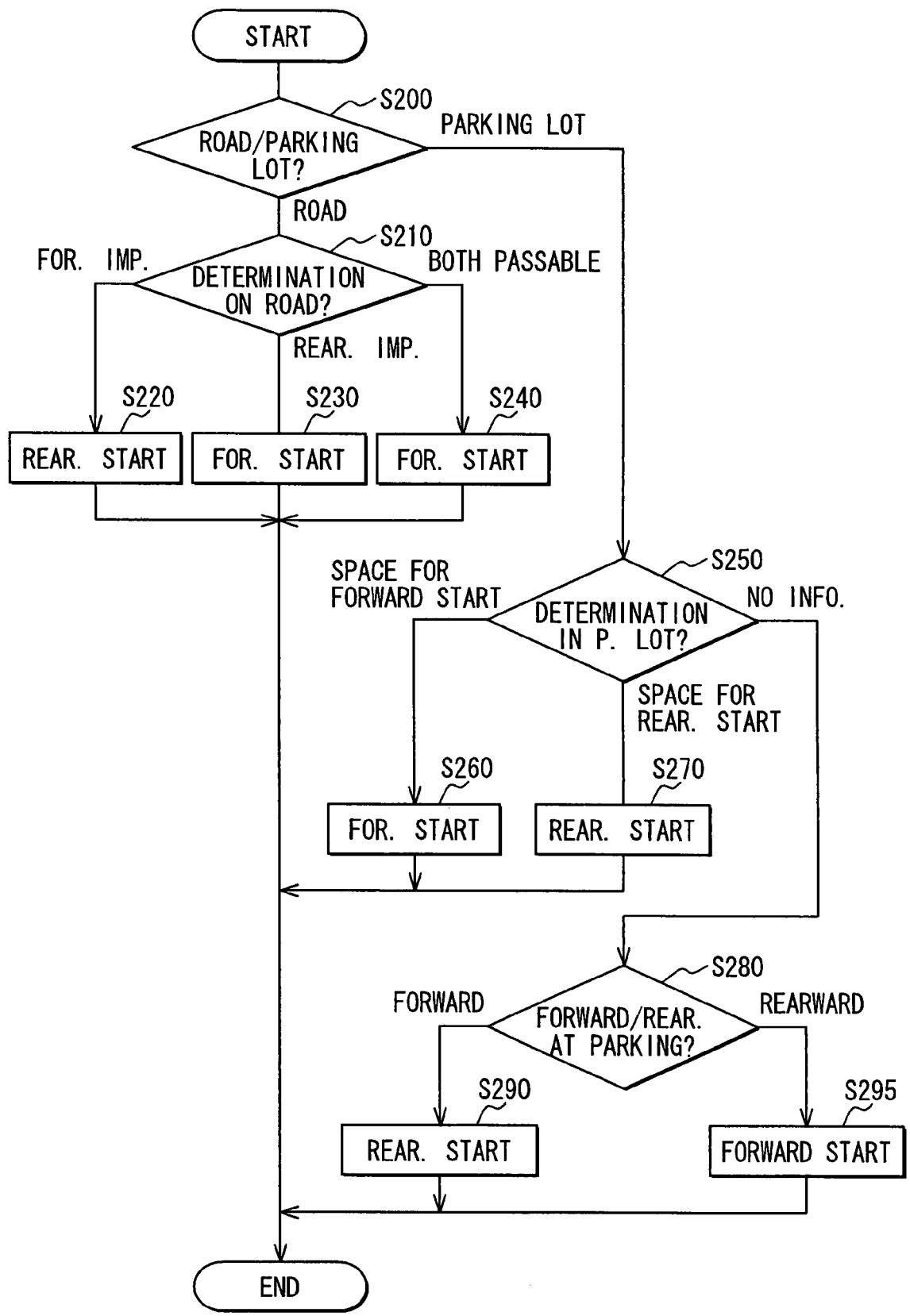
FIG. 9 is a flowchart diagram illustrating a start direction estimation at parking according to the second embodiment.

As shown in FIG. 9, at Step S200, it is determined whether the parked area is on a parking lot or on a road based on the information acquired from the map data of the navigation system.

When the vehicle is on a road, a threefold choice takes place at Step S210 to select one of (i) an area forward of the vehicle is impassable, (ii) an area rearward of the vehicle is impassable, and (iii) areas forward and rearward of the vehicle are passable.

Figure 10:
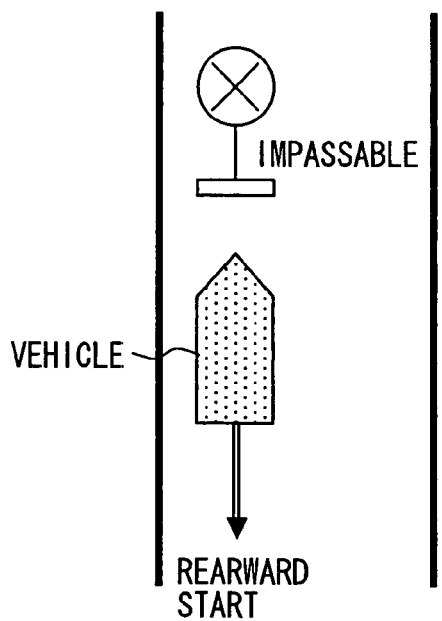
FIG. 10 is a view illustrating a state in which a vehicle is parked on a road and unable to move forward, according to the second embodiment.

As shown in FIG. 10, when an area forward of the vehicle is impassable, the movement direction is estimated as a rearward start (i.e., rearward movement at start) at Step S220 and the process once ends.

Figure 11:
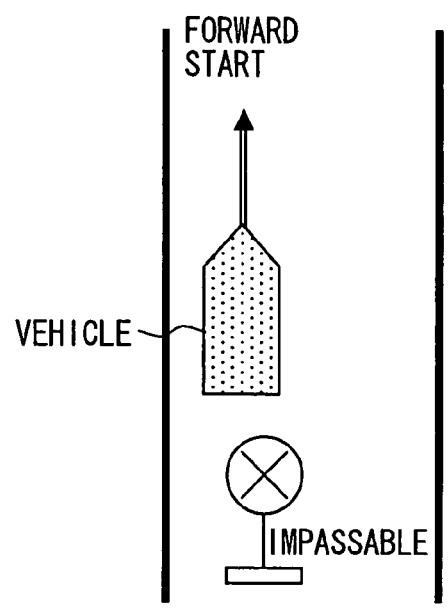
FIG. 11 is a view illustrating a state in which a vehicle is parked on a road and unable to move rearward, according to the second embodiment.

As shown in FIG. 11, when an area rearward of the vehicle is impassable, the movement direction is estimated as a forward start (i.e., forward movement at start) at Step S230 and the process once ends.

Figure 12:
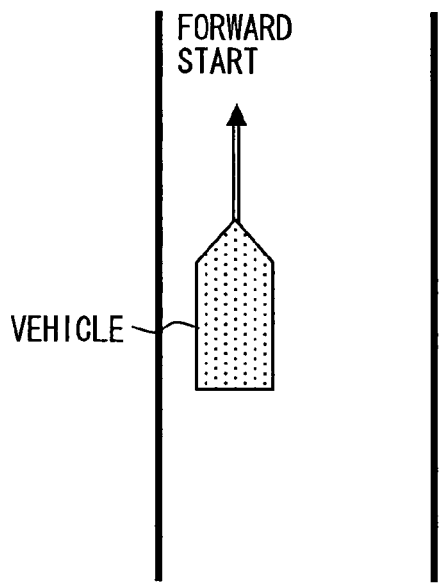
FIG. 12 is a view illustrating a state in which a vehicle is parked on a road and able to move forward and rearward, according to the second embodiment.

Further, as shown in FIG. 12, when areas forward and rearward of the vehicle are passable, the movement direction is estimated as a forward start (i.e., forward movement at start) at Step S240 and the process once ends.

In contrast, when the parked area is determined to be on a parking lot at Step S200, the process goes to Step S250. Here, it is determined whether an individual parking space is designed or determined for forward start or rearward start, or whether information on the parking space is unavailable, based on the map data.

Figure 13:
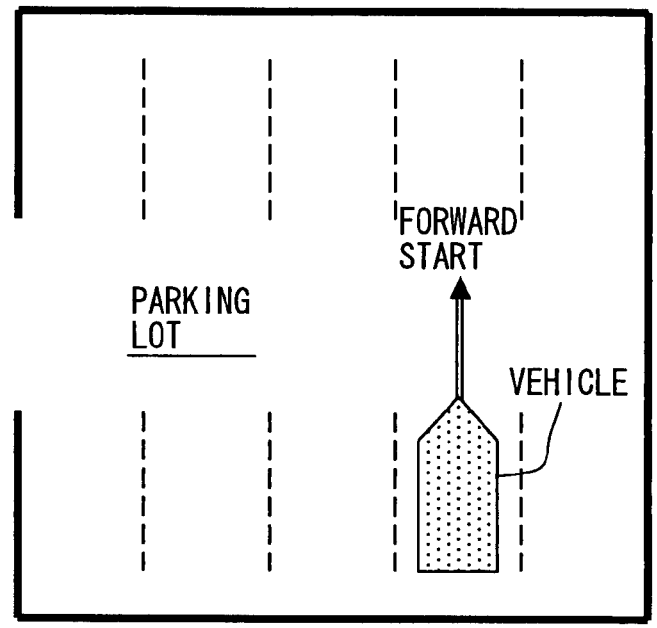
FIG. 13 is a view illustrating a state in which a vehicle is parked on a parking space and to start forward, according to the second embodiment.

As shown in FIG. 13, when the space is for forward start, the movement direction is estimated as a forward start (i.e., forward movement at start) at Step S260 and the process once ends.

Figure 14:
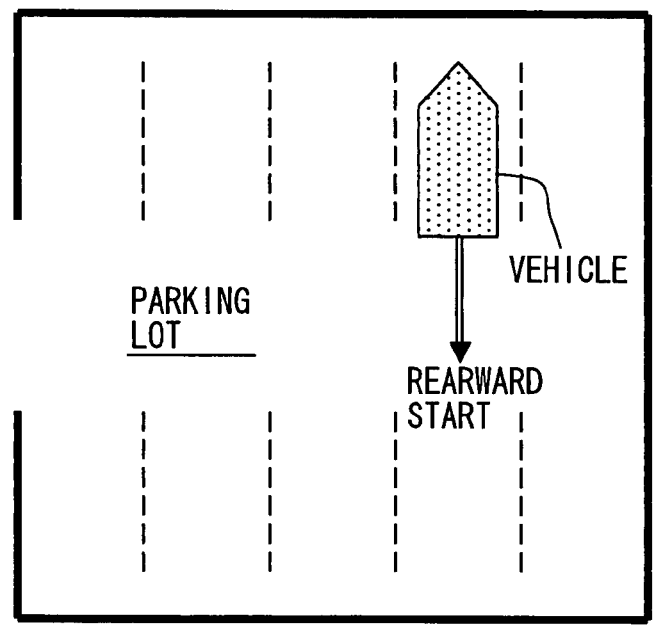
FIG. 14 is a view illustrating a state in which a vehicle is parked on a parking space and to start rearward, according to the second embodiment.

As shown in FIG. 14, when the space is for rearward start, the movement direction is estimated as a rearward start (i.e., rearward movement at start) at Step S270 and the process once ends.

Further, when information on the parking space is unavailable, a movement direction at parking is determined based on the vehicle drive sensor 133.

When the gear position is shifted to forward movement (i.e., the D range) while being parked, the movement direction at start is estimated as rearward start at Step S290 and the process once ends.

When the gear position is shifted to rearward movement (i.e., the R range) while being parked, the movement direction at start is estimate as forward start at Step S295 and the process once ends.

(2) Process During Start Operation

The process starts when the ACC is turned on. When the ACC is tuned on, it is supposed to that the vehicle is to be started from the parked area.

Figure 15:
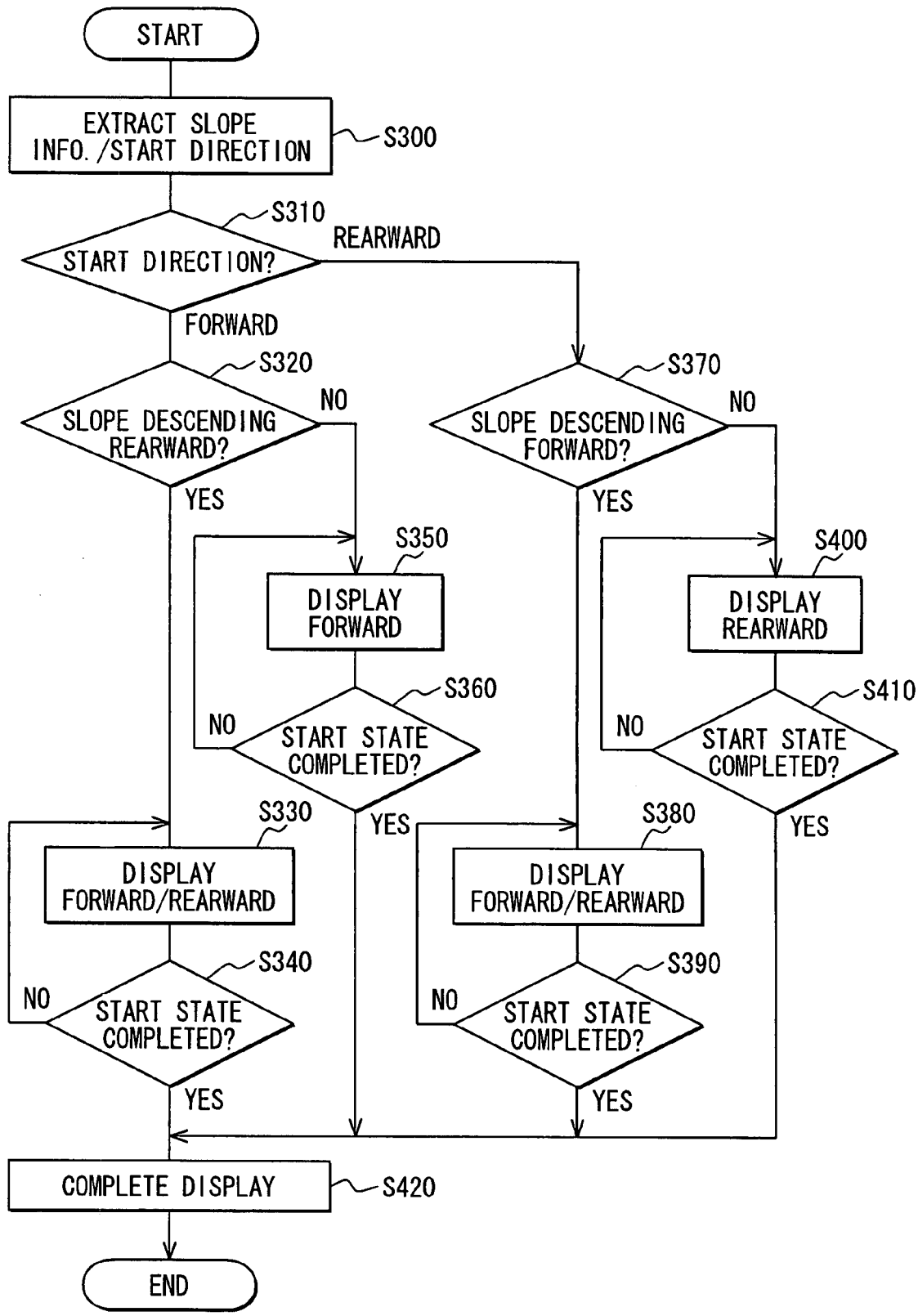
FIG. 15 is a flowchart diagram illustrating an overall process at start according to the second embodiment.

As shown in FIG. 15, at Step S300, at a start of the vehicle, the estimated information and slope information stored in the external memory device 107 during the parking operation are extracted or read out.

At Step S310, it is determined whether the estimated movement direction is forward or rearward based on the extracted estimated information.

When forward, it is then determined whether an area rearward of the vehicle is leveled significantly lower than the parked area at Step S320. When the determination at Step S320 is affirmed, the process goes to Step S330. In contrast, when negated, the process goes to Step S350.

At Step S330, videos showing areas forward and rearward of the vehicle are displayed on the display device 109. Since the road surface in an area rearward of the parked area is leveled lower than the current parked area, the vehicle may be slightly moved rearward at start, although the vehicle is intended to be moved forward at start.

At Step S340, it is determined whether a starting state of the vehicle is completed or not (e.g., whether a vehicle speed is equal to or greater than a predetermined speed), based on a speed signal (i.e., vehicle speed) from the vehicle drive sensor 133. When the determination at Step S340 is affirmed, the process goes to Step S420; when negated, the process returns to Step S330.

In contrast, at Step S350 performed when the determination at Step S320 is negated, a video showing an area forward of the vehicle is displayed on the display device 109. This is because that the road surface in an area rearward of the parked area is leveled not significantly lower than the current parked area and the vehicle is to be forward moved.

At Step S360, it is determined whether a starting state of the vehicle is completed or not, based on the speed signal from the vehicle drive sensor 133, similarly with Step S340. When the determination at Step S360 is affirmed, the process goes to Step S420. In contrast, when negated, the process returns to Step S350.

At Step S370 performed when the estimated movement direction is determined to be rearward at Step S310, it is determined whether an area forward of the vehicle is leveled significantly lower than the parked area. When the determination at Step S370 is affirmed, the process goes to Step S380. In contrast, when negated, the process goes to Step S400.

At Step S380, videos showing areas forward and rearward of the vehicle are displayed on the display device 109. Since the road surface in an area forward of the parked area is leveled lower than the current parked area, the vehicle may be slightly moved forward at start, although the vehicle is intended to be moved rearward at start.

At Step S390, it is determined whether a starting state of the vehicle is completed or not, based on the speed signal from the vehicle drive sensor 133, similarly with Step S340. When the determination at Step S390 is affirmed, the process goes to Step S420. In contrast, when negated, the process returns to Step S380.

In contrast, at Step S400 performed when the determination at Step S370 is negated, a video showing an area rearward of the vehicle is displayed on the display device 109. This is because that the road surface in an area forward of the parked area is leveled not significantly lower than the current parked area and the vehicle is to be rearward moved.

At Step S410, it is determined whether a starting state of the vehicle is completed or not, based on the speed signal from the vehicle drive sensor 133, similarly with Step S340. When the determination at Step S410 is affirmed, the process goes to Step S420. When negated, the process returns to Step S400.

At Step S420 performed when the determination at Step S340, S360, S390, or S410 is affirmed, displaying each video for the necessary area is stopped since the need of videos is no longer present. The process once ends.

d) As explained in the above second embodiment, a movement direction at start (i.e., start direction) is estimated during the parking operation to a parked area. At start or re-start of the vehicle from the parked area, a video or image showing a necessary direction can be displayed, further, in consideration of slope information on the parked area. Thus, safety in a movement direction at start of the vehicle from the parked area can be promptly and securely checked. This may produce an advantage in relieving the driver's load and decreasing occurrence ratio of accidents.

Further, Step S140 in FIG. 8 may be configured as a movement direction estimation unit, while Steps S330, S350, S380, S400 can be configured as a display control unit.

First Modification of Second Embodiment

Next, a first modification of the second embodiment will be explained below. In this modification, a movement direction at start is re-estimated if the vehicle is parked on a road.

Figure 16:
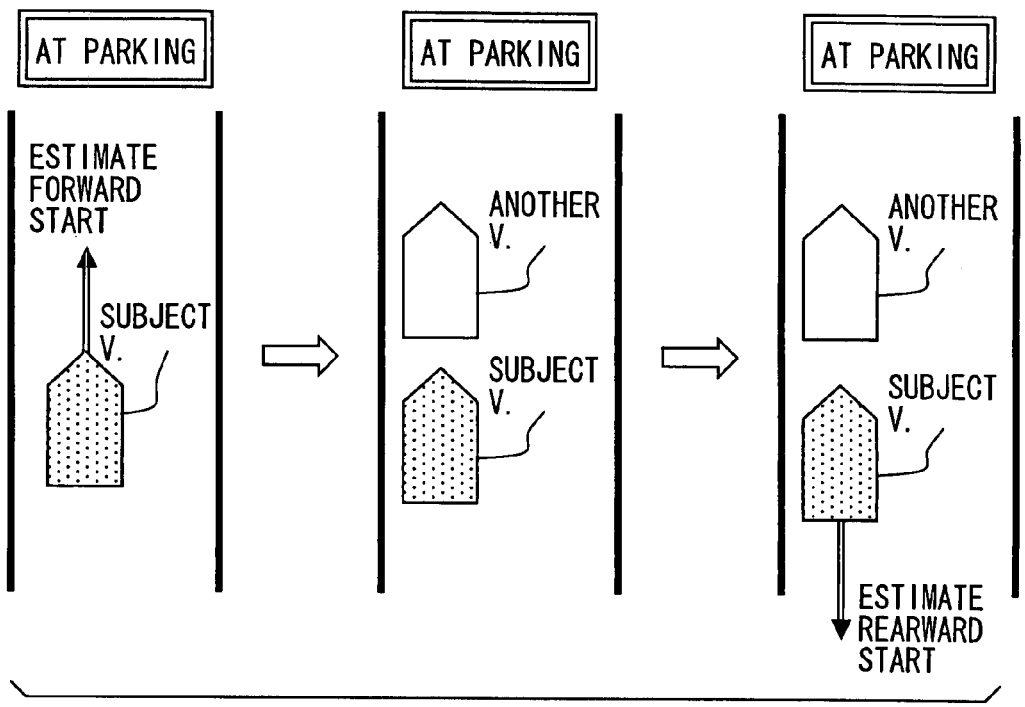
FIG. 16 is a diagram illustrating a first modification of the second embodiment.

As shown in FIG. 16, even if a forward start was estimated during the parking operation, there may be a case that another vehicle is thereafter parked in front of (i.e., forward of) the subject vehicle.

In this case, if another vehicle present forward of the subject vehicle is recognized by processing an image photographed by the forward camera 127a, the initially estimated forward start becomes impossible to thereby re-estimate rearward start.

This allows the drive assist system to anticipate a change in the state surrounding the parked vehicle.

Second Modification of Second Embodiment

Next, a second modification of the second embodiment will be explained below. In this modification, a movement direction at start is also re-estimated if the vehicle is parked on a road.

Figure 17:
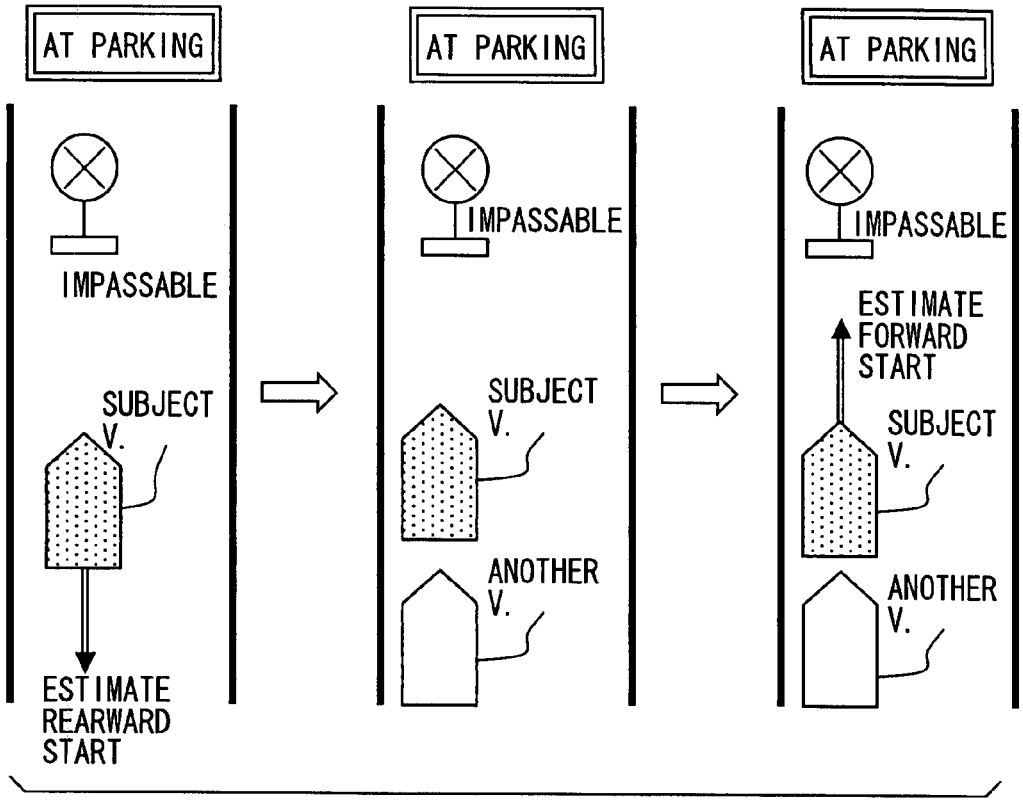
FIG. 17 is a diagram illustrating a second modification of the second embodiment.

As shown in FIG. 17, if a road forward of the vehicle is impassable due to traffic regulation or the like, rearward start is typically estimated during the parking operation.

However, there may be a case that, after the rearward start is estimated, another vehicle is parked rearward of the subject vehicle.

In this case, if another vehicle present rearward of the subject vehicle is recognized by processing an image photographed by the rearward camera 127b, the initially estimated rearward start becomes impossible to thereby re-estimate forward start.

This allows the drive assist system to anticipate a change in the state surrounding the parked vehicle.

Further, estimating a movement direction at start is estimated preferably during the parking operation to decrease computation load at start; however, it can be alternatively estimated when the vehicle is started from the parked area.

Further, the slope information can be extracted for determining which video of the surrounding area should be used at a time when the vehicle is parked, instead of a time when the vehicle is started. In this case, the extracted slope information is once stored in proper memory and the stored extracted slope information is thereafter considered to determine which video of the surrounding area should be used.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A drive assist system for a vehicle, the system comprising:
   a notification unit configured to perform a notification operation for assisting a driver in moving the vehicle;
   a surrounding detection unit configured to detect surrounding information on a surrounding of the vehicle;
   a parking information acquisition unit configured to acquire, as parking information, information during a period of a parking operation from when the parking operation starts to when the vehicle stops in a parked area;
   a start method computation unit configured to compute, when starting the vehicle from the parked area, a start method including a movement direction of the vehicle based on (i) a vehicle specification indicating a dimension of the vehicle, (ii) the acquired parking information, and (iii) the detected surrounding information; and
   a notification control unit configured to cause the notification unit to notify the computed start method,
   wherein the parking information acquisition unit acquires, as parking information, a swept path of the vehicle from a predetermined position to the parked area during the period of the parking operation;
   wherein the parking information acquisition unit acquires the swept path of the vehicle undergoing a forward parking, in which the vehicle is moved forward to enter the parked area and
   wherein the start method computation unit computes, as a start method, a rearward exit method for the vehicle to exit from the parked area by referring to the swept path included in the acquired parking information.

2. The drive assist system of claim 1, wherein:
   the start method computation unit is configured to receive detection output from (i) a steering angle sensor for detecting a steering angle of a steering wheel of the vehicle and (ii) a speed sensor for detecting a speed of the vehicle;
   the start method computation unit includes a collision estimation unit to perform an estimation of a possibility of collision between the vehicle and an obstacle based on the surrounding information detected by the surrounding detection unit and the received detection output from the steering angle sensor and the speed sensor; and
   the notification control unit causes the notification unit to notify an alarm corresponding to a result of the estimation by the collision estimation unit.

3. The drive assist system of claim 2, wherein,
   when the result of the estimation while the vehicle is moved rearward indicates a collision between the vehicle and an obstacle, the notification control unit causes the notification unit to notify an operation for moving the vehicle and an operation for turning the steering wheel to prevent the collision.

4. The drive assist system of claim 1, wherein;
   the surrounding detection unit includes an obstacle detection unit to detect a distance to an obstacle present in an area forward, rearward, right sideward, or left sideward of the vehicle; and
   the start method computation unit computes the start method when starting the vehicle, by referring to the detected distance to the obstacle.

5. The drive assist system of claim 1,
   wherein the dimension of the vehicle includes at least one of a length of the vehicle and a width of a vehicle.

6. A drive assist system for a vehicle, the system comprising:
   a notification unit configured to perform a notification operation for assisting a driver in moving the vehicle;
   a surrounding detection unit configured to detect surrounding information on a surrounding of the vehicle;
   a parking information acquisition unit configured to acquire, as parking information, information during a period of a parking operation from when the parking operation starts to when the vehicle stops in a parked area;
   a start method computation unit configured to compute, when starting the vehicle from the parked area, a start method including a movement direction of the vehicle based on (i) a vehicle specification indicating a dimension of the vehicle, (ii) the acquired parking information, and (iii) the detected surrounding information; and
   a notification control unit configured to cause the notification unit to notify the computed start method,
   wherein the notification unit includes a display device to display a video;
   wherein the surrounding detection unit includes a photographing unit to photograph as video an area surrounding the vehicle;
   wherein the start method computation unit includes a movement direction estimation unit to estimate a movement direction of the vehicle at start from the parked area based on the acquired parking information; and
   wherein the notification control unit causes the display device to display a video photographing an area in a movement direction of the vehicle estimated by the movement direction estimation unit when the vehicle is started from the parked area.

7. The drive assist system of claim 6, wherein:
the movement direction estimation unit estimates the movement direction of the vehicle at start, during the period of the parking operation.

8. The drive assist system of claim 6, wherein:
the parking information includes at least one of information on the parked area and information on movement direction of the vehicle at parking.

9. The drive assist system of claim 8, wherein:
the information on the parked area indicates whether the vehicle is parked on a parking lot or on a road.

10. The drive assist system of claim 8, wherein:
the information on the parked area includes slope information indicating a state of a slope of the parked area relative to a horizontal plane.

11. The drive assist system of claim 6, wherein,
when the movement direction of the vehicle at start is different from a direction, to which a slope of the parked area is descending, the display device is caused to display video showing areas forward and rearward of the vehicle.

12. The drive assist system of claim 6,
wherein the dimension of the vehicle includes at least one of a length of the vehicle and a width of a vehicle.

13. The drive assist system of claim 6,
wherein the acquired parking information includes at least one of a slope direction of the parked area and a slope angle of the parked area.

14. A method for assisting a driver in starting a vehicle from a parked area, the method comprising the steps of:
acquiring, as parking information, information during a period of a parking operation for parking the vehicle from when the parking operation starts to when the vehicle stops in the parked area;
detecting surrounding information on a surrounding of the vehicle;
computing, when starting the vehicle from the parked area, a start method including a movement direction of the vehicle based on the acquired parking information and the detected surrounding information; and
notifying the driver of the computed start method via a display device,
wherein the parking information acquisition unit acquires, as parking information, a swept path of the vehicle from a predetermined position to the parked area during the period of the parking operation;
wherein the parking information acquisition unit acquires the swept path of the vehicle undergoing a forward parking, in which the vehicle is moved forward to enter the parked area and
wherein the start method computation unit computes, as a start method, a rearward exit method for the vehicle to exit from the parked area by referring to the swept path included in the acquired parking information.

15. A drive assist system for a vehicle, the system comprising:
a display device configured to display a notification operation for assisting a driver in moving the vehicle;
a photographing unit configured to photograph, as video, an area surrounding the vehicle;
a parking information acquisition unit configured to acquire parking information during a period of a parking operation for parking the vehicle from when the parking operation starts to when the vehicle stops in a parked area; and
a movement direction estimation unit configured to compute, when starting the vehicle from the parked area, a movement direction at start of the vehicle based on the acquired parking information,
wherein the display device displays, when the vehicle is started from the parked area, the photographed video showing an area in a movement direction of the vehicle estimated by the movement direction estimation unit;
wherein the parking information includes a movement direction at parking and slope information on a slope of the parked area relative to a horizontal plane; and
wherein when the movement direction of the vehicle at start is different from a direction to which the slope is descending, the display device is caused to display the photographed videos showing areas forward and rearward of the vehicle.

* * * * *